(12) United States Patent
Petersen et al.

(10) Patent No.: US 9,689,517 B2
(45) Date of Patent: Jun. 27, 2017

(54) TOOL-FREE METAL CONDUIT CONNECTOR AND RELATED METHODS

(75) Inventors: Sheridon Petersen, Louisville, KY (US); Barry Peters, Louisville, KY (US); Bruce Thompson, Louisville, KY (US)

(73) Assignee: REPUBLIC CONDUIT, INC., Louisville, KY (US)

( * ) Notice: Subject to any disclaimer, the term of this patent is extended or adjusted under 35 U.S.C. 154(b) by 0 days.

(21) Appl. No.: 12/889,074

(22) Filed: Sep. 23, 2010

(65) Prior Publication Data
US 2012/0074689 A1   Mar. 29, 2012

(51) Int. Cl.
*F16L 21/02* (2006.01)
*F16L 37/091* (2006.01)

(52) U.S. Cl.
CPC .................. *F16L 37/091* (2013.01)

(58) Field of Classification Search
USPC .... 285/104, 256, 257, 286.2, 382.7, 40, 340
See application file for complete search history.

(56) References Cited

U.S. PATENT DOCUMENTS

| | | | | |
|---|---|---|---|---|
| 2,484,192 A | * | 10/1949 | Squiller | F16L 37/091 285/140.1 |
| 3,204,988 A | * | 9/1965 | Dunton | F16L 37/091 277/619 |
| 5,603,530 A | * | 2/1997 | Guest | 285/105 |
| 7,500,699 B2 | * | 3/2009 | Snyder et al. | 285/340 |
| 2008/0309081 A1 | * | 12/2008 | De Wilde | 285/340 |

* cited by examiner

*Primary Examiner* — Aaron Dunwoody

(57) ABSTRACT

A threadless connector includes a connector body having a central bore therethrough and a retainer ring disposed in an end of the connector body, the retainer ring comprising a plurality of teeth segments, wherein the plurality of teeth segments are configured to be inwardly angled to contact an end of a conduit inserted into the connector body.

17 Claims, 6 Drawing Sheets

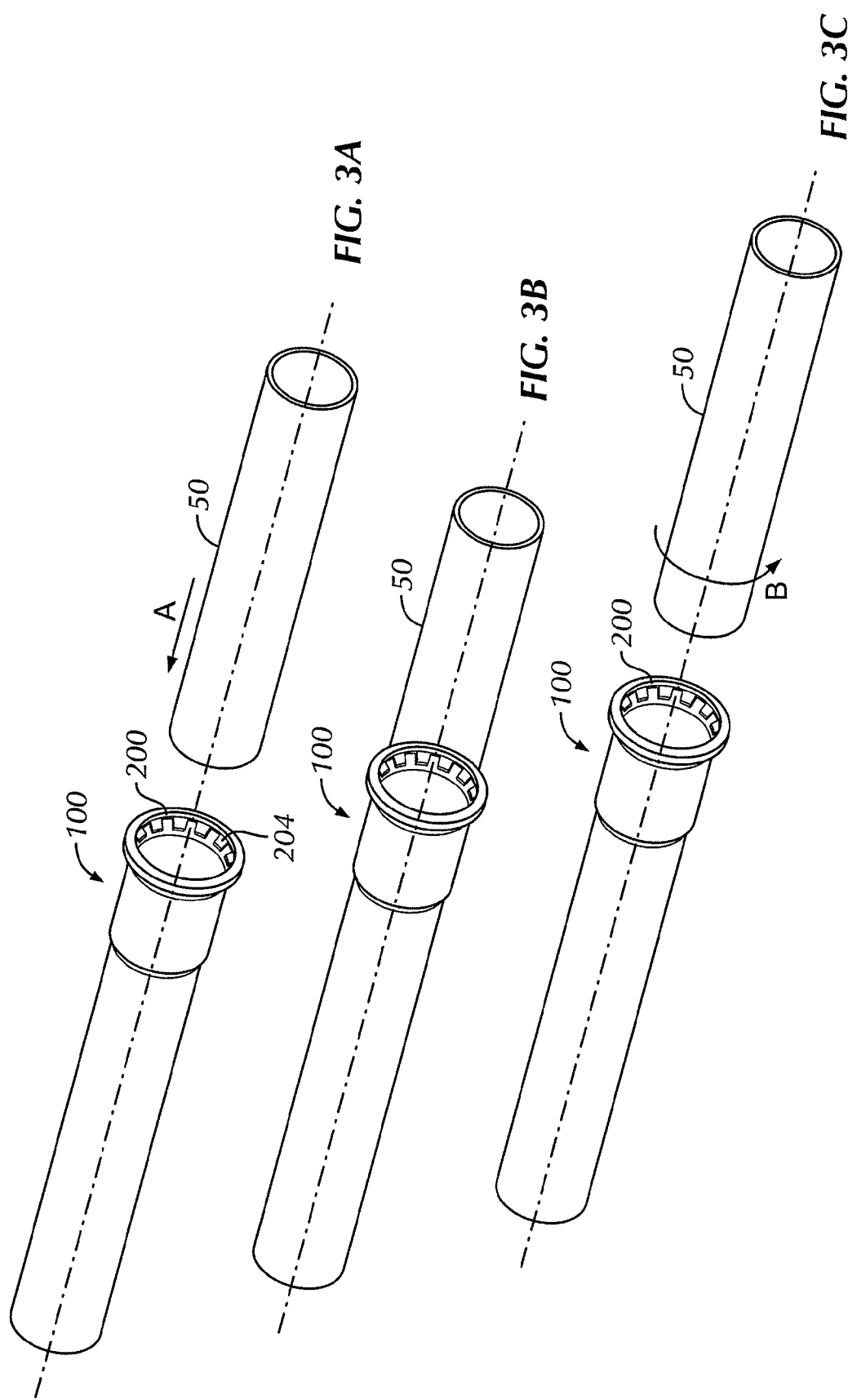

TOOL-FREE METAL CONDUIT CONNECTOR AND RELATED METHODS

BACKGROUND

Field of the Disclosure

Embodiments disclosed herein relate generally to tubular connectors. In particular, embodiments disclosed herein relate to tool-free tubular connectors for joining tubular conduit. More particularly, embodiments disclosed herein relate to connectors having an interior retainer ring for securing tubular conduit.

Background Art

An electrical conduit is an electrical piping system used for protection and routing of electrical wiring. Electrical conduit may be made of metal, plastic, fiber, or other materials. Flexible conduit is available for special purposes. Electrical Metallic Tubing ("EMT"), sometimes called thin-wall, is commonly used instead of Electrical Rigid Metal Conduit—Steel ("ERMC-S") or Intermediate Metal Conduit ("IMC") because EMT is less costly and lighter. However, EMT is not capable of being threaded. Therefore, lengths of conduit may be connected to each other and to equipment with Screw Type or Compression clamp-type fittings.

Typically, existing connectors require the use of hand tools to assemble EMT conduit. An end of a conduit is inserted into the connector having a screw type or compression grip ring therein. The compression grip ring has no tabs, or barbs, in the interior of the connector. Compression connector engages the outer surface of the conduit by means of compression ring to secure the conduit with the connector. The Screw Type connector has one or two screws that are tightened to engage the conduit. The compression grip rings and screw type are typically required to hold against a minimum specified axial pull-out force, which may be from 300 to 1,000 pounds depending on diameter of conduit. However, the required pull-out force is typically greater than the average person could reasonably exert without the aid of tools.

Accordingly, there exists a need for a tool-free threadless connection in which conduit may be installed and removed from without requiring the use of tools while maintaining sufficient axial pull-out force.

SUMMARY OF THE DISCLOSURE

In one aspect, embodiments disclosed herein relate to a threadless connector including a connector body having a central bore therethrough and a retainer ring disposed in an end of the connector body, the retainer ring comprising a plurality of teeth segments, wherein the plurality of teeth segments are configured to be inwardly angled to contact an end of a conduit inserted into the connector body.

In other aspects, embodiments disclosed herein relate to a retainer ring for a threadless connector, the retainer ring including a circular band having a plurality of teeth segments extending axially therefrom and arranged around a circumference of the circular ring.

In other aspects, embodiments disclosed herein relate to a method of fixing an end of a conduit in a threadless connector, the method including installing a retainer ring having a plurality of teeth segments in a distal end of the threadless connector, removably securing the conduit into the distal end of the threadless connector, and engaging an outer surface of the conduit with the plurality of teeth segments of the retainer ring.

Other aspects and advantages of the invention will be apparent from the following description and the appended claims.

BRIEF DESCRIPTION OF DRAWINGS

FIG. 3A shows a perspective view of assembly of a conduit into a tubular connector in accordance with one or more embodiments of the present disclosure.

FIG. 3B shows a perspective view of an assembled conduit and tubular connector in accordance with one or more embodiments of the present disclosure.

FIG. 3C shows a perspective view of disassembly of the conduit from the tubular connector in accordance with one or more embodiments of the present disclosure.

DETAILED DESCRIPTION

Figure 1A:
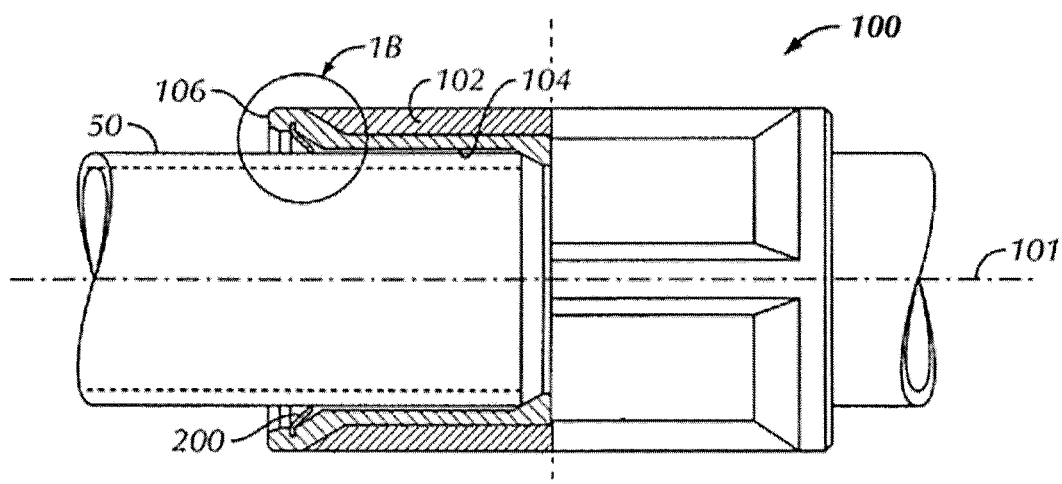
FIGS. 1A and 1B show partial cross-sectional and enlarged views, respectively, of a tubular connector in accordance with one or more embodiments of the present disclosure.

In one aspect, embodiments disclosed herein relate to tool-free tubular connectors for joining tubular conduit. More particularly, embodiments disclosed herein relate to connectors having an interior retainer ring for securing tubular conduit and related methods. Referring to FIG. 1A, a cross-sectional view of a tool-free connector 100 in accordance with one or more embodiments of the present disclosure is shown. The connector 100 includes a connector body 102 having a central bore 104 and a central axis 101 therethrough. Further, the connector body 102 may have a flange 106 formed on an end thereof.

Figure 4:
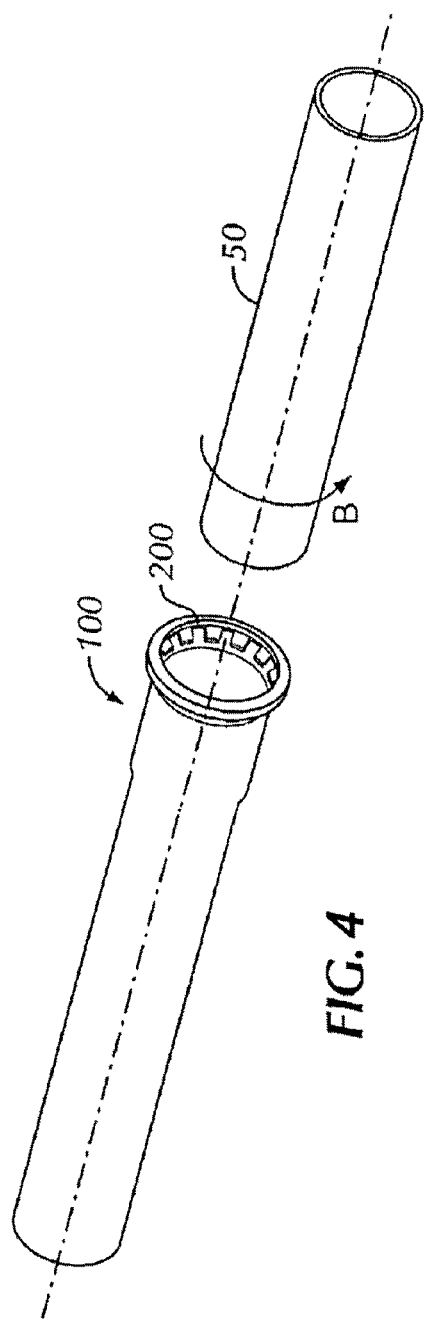
FIG. 4 shows a exploded view of a connection of a conduit and a tubular connector in accordance with one or more embodiments of the present disclosure.

The connector body 102 may be comprised of an electrically conductive material (e.g., metallic materials). In certain embodiments, the connector body 102 may be comprised of steel. In alternate embodiments, the connector body 102 may be comprised of zinc plated steel. In other embodiments, the connector body 102 may be comprised of a diecast, formed, or machined material, for example, including, but not limited to, a zinc aluminum alloy. The connector 100 may be used in a number of different fitting configurations. Thus, while FIG. 1 shows the connector 100 as a coupling, those skilled in the art will understand the connector 100 may be used with other fitting configurations including, but not limited to couplings, elbows, tees and an electrical box connector fitting. This tool-free connection may also be integrally formed into a length of conduit, as shown in FIG. 4.

Referring still to FIG. 1A, a retainer ring 200 is disposed in the inner surface of flange 106 of the connector body 102 and is configured to extend radially inward to engage an end of a conduit 50 that is inserted into the connector body 102. The retainer ring 200 may be removably inserted (e.g., pressed, fastened) into the flange 106 and engage a circumferential groove (not shown) or other recess formed in an inner wall of the flange to secure the retainer ring 200 in the connector body 102. In other embodiments, the retainer ring 106 may be integrally formed in the connector body 102. The retainer ring 200 is configured to secure the conduit 50 within the connector body 102 (i.e., prevent pull-out of the conduit 50 from the connector body 102 when a certain predetermined axial force is applied). In certain embodiments, the retainer ring 200 may withstand an axial pull-out force on the conduit 50 of between about 300 and 1,000 pounds. The retainer ring 200 may be comprised of an electrically conductive material, for example, including, but not limited to, spring steel and other metallic materials.

Figure 2A:
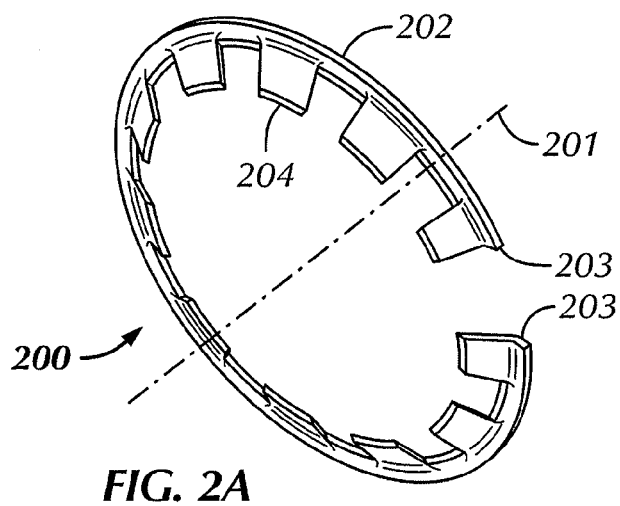
FIG. 2A shows a perspective view of a retainer ring of a tubular connector in accordance with one or more embodiments of the present disclosure.
Figure 2B:
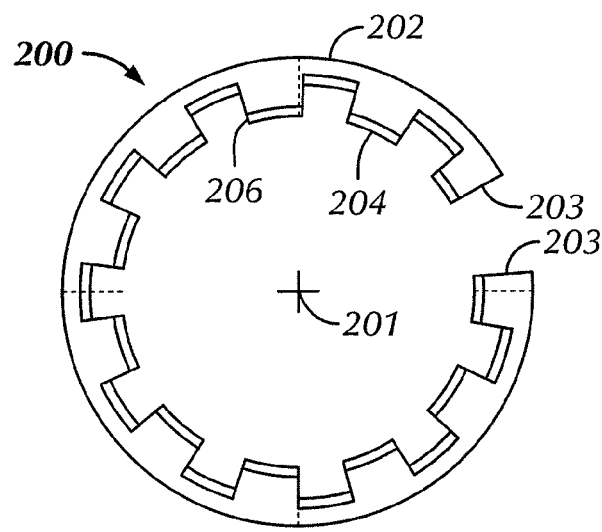
FIG. 2B shows a front view of the retainer ring of FIG. 2A in accordance with one or more embodiments of the present disclosure.

Referring now to FIGS. 2A and 2B, perspective and front views of the retainer ring 200 in accordance with one or more embodiments of the present disclosure are shown. The retainer ring 200 includes a circular band 202 formed about a central axis 201 and having multiple teeth segments 204 extending inward therefrom. In certain embodiments, the circular band 202 may be formed as a split band or ring, i.e., the circular band 202 has two ends 203 between which a gap is formed. In alternate embodiments, the circular band 202 may be formed as a continuous ring. As shown, the teeth segments 204 are arranged all on one side of the circular band 202 and may be evenly spaced around a circumference of the circular band 202. In other embodiments, the teeth segments 204 may be unevenly spaced. The teeth segments 204 may be angled inwardly toward the central axis 201. The inward angle of the teeth segments 204 is indicated by angle α in FIG. 2D. Angle α may be defined as the angle formed between a plane passing through the circular band 202 and a plane passing through the teeth segments 204, as shown. In certain embodiments, the angle α may be between about 30 and 60 degrees. The angle α may be configured to create resistance against a specified axial pull-out force of between about 300 and 1,000 lbs. The angle α may be configured to create minimal resistance for tool-free assembly.

Figure 1B:
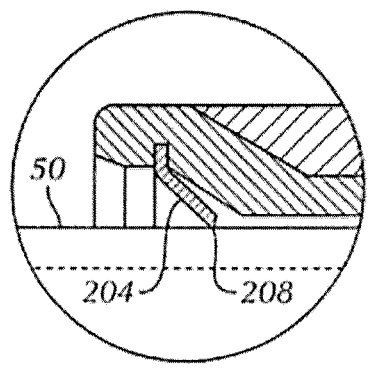
Figure 2D:
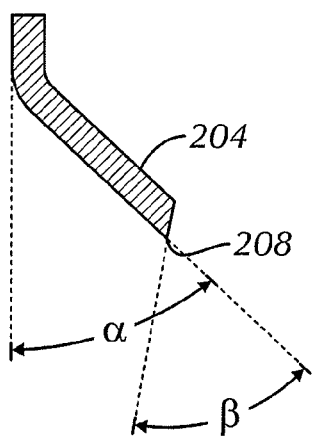
FIG. 2D shows an enlarged cross-sectional view of a tooth segment of the retainer ring of FIG. 2A in accordance with one or more embodiments of the present disclosure.

Further, as shown in FIG. 2D, a leading i.e. distal edge 208 of a tooth segment of the teeth segments 204, which is the surface with which the teeth segments 204 engage or grab the conduit (as shown in FIG. 1B), may be formed having a tip angle β configured to create resistance against the specified axial pull-out force. Tip angle β may be defined as the angle between surfaces that form distal edge 208 of teeth segments 204. In certain embodiments, the angle β may be between about 30 and 90 degrees. The tip angle β may be configured to ensure penetration of the conduit surface by teeth segments 204 and create a sufficient connection between the retainer ring 200 and the conduit 50 to ensure electrical conductivity therethrough. Further, in certain embodiments, one or more corners 206 (FIG. 2C) of the teeth segments 204 may be radiused to allow the teeth segments 204 to slide over the conduit (not shown) while rotating the conduit (for example, during disassembly, which is explained in detail below).

Figure 2C:
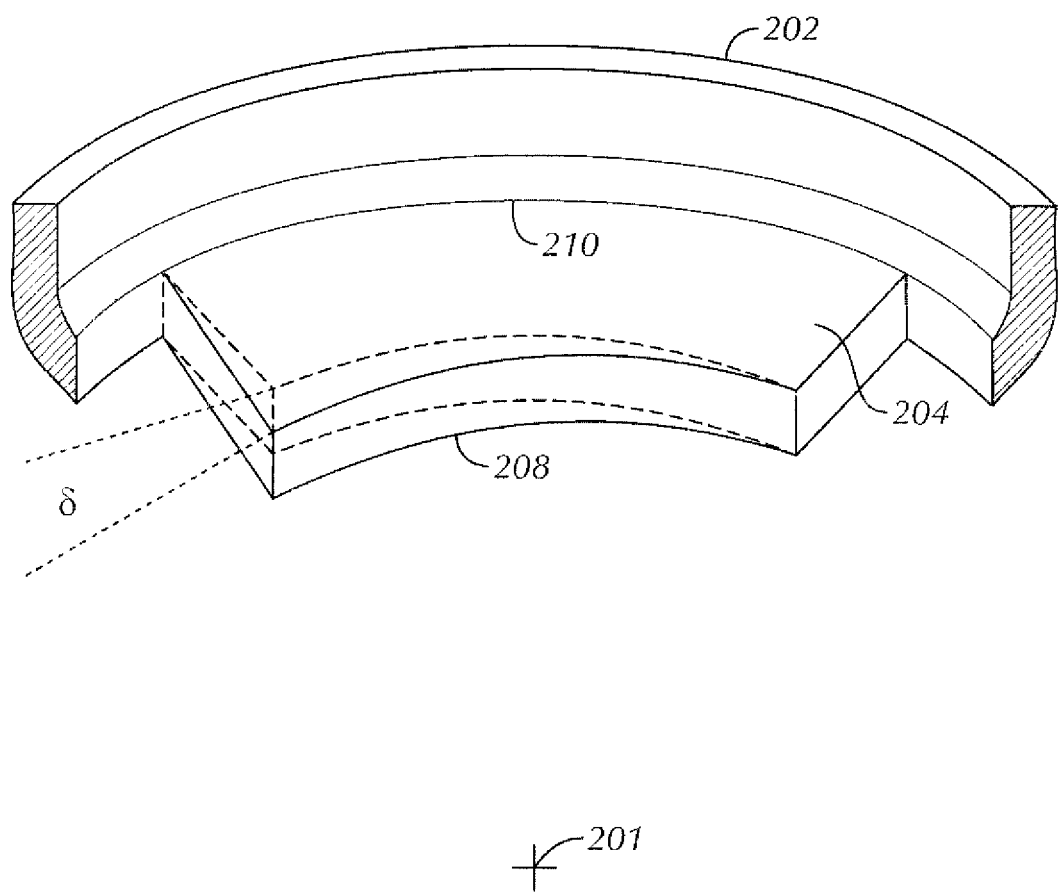
FIG. 2C shows an enlarged perspective view of a tooth segment of the retainer ring of FIG. 2A in accordance with one or more embodiments of the present disclosure.
Figure 2E:
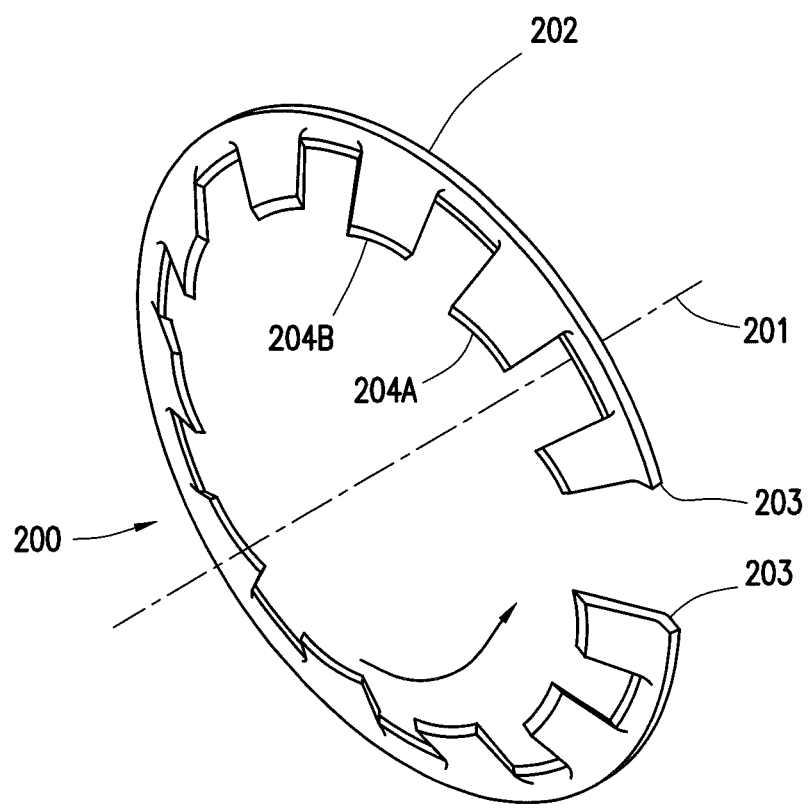
FIG. 2E shows a perspective view of a retainer ring of a tubular connector in a helix configuration in accordance with one or more embodiments of the present disclosure.

Referring specifically to FIG. 2C, an enlarged perspective view of a tooth segment 204 of the retainer ring 200 in accordance with embodiments of the present disclosure is shown. In particular, as shown in FIG. 2C and FIG. 2E, the teeth segments 204 may be configured having a slight helix configuration (i.e., an angular "twist") indicated by angle δ. The helix configuration may be created in the teeth segments 204 when a base 210 of each of the teeth segments 204 is fixed to circular band 202 (and concentric therewith) while a distal end or edge 208 of each of the teeth segments 204 is twisted slightly, which creates an angle δ, as shown in FIG. 2C. Stated otherwise, the distal edge 208 of each of the teeth segments 204 is not concentric with a circumference of the circular band 202. Stated another way, the teeth segments 204 are non-conical along their entire axial length as they extend away from circular band 202. In certain embodiments, the helix angle δ may be between about 2 and 15 degrees. FIG. 2E shows the helix configuration created, as discussed above, in the teeth segments 204. In FIG. 2E, a distal edge of tooth segment 204A and tooth segment 204B are each twisted slightly and in a same direction so as to create a helix configuration for the teeth segments 204 of retainer ring 200.

The helix configuration of the teeth segments 204 may allow a conduit to be removed from the connector by rotating the conduit in the direction of the helix. In certain embodiments, the teeth segments 204 may be configured having a left hand helix, thus, the conduit may be rotated counterclockwise to remove it from the connector. In alternate embodiments, the teeth segments 204 may be configured having right hand helix.

Methods of using a connector 100 in accordance with embodiments disclosed herein are illustrated in FIGS. 3A-3C. As shown in FIG. 3A, retainer ring 200 is disposed in the connector 100 with teeth segments 204 facing inward, i.e., axially away from the inserted conduit. A length of conduit 50 may be pushed (indicated by arrow A) axially into the bore of connector 100 and engage retainer ring 200 disposed therein. FIG. 3B illustrates the assembled conduit 50 and connector 100. As described above, the connector 100 may be capable of resisting an axial pull-out force on the conduit 50 of between about 300 and 1,000 pounds due to engagement between the retainer ring 200 and outer surface of the conduit 50. To remove the conduit 50 from the connector 100, the conduit 50 may be rotated counterclockwise (indicated by arrow B) while pulling the conduit 50 axially away from the connector 100. In other embodiments, a retainer ring 200 having a right hand helix may by rotated clockwise to remove the conduit 50. Thus, a combination of rotating while applying an axial force allows the conduit 50 to be removed from the connector without tools.

Advantageously, embodiments of the present disclosure may provide a tool-free connector into which conduit may be inserted and removed without the need for hand tools. The quick installation and removal of the conduit may decrease assembly and disassembly time which allows the user to assemble EMT conduit connections more efficiently. Further, the tool-free connector includes an electrically conductive connector body and retainer ring such that electrical conductivity may be maintained through the connection.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A threadless connector comprising:
   a connector body having a central bore therethrough; and
   a retainer ring disposed in an end of the connector body, the retainer ring comprising a plurality of teeth segments;
   wherein the plurality of teeth segments are configured to be inwardly angled to contact an end of a conduit inserted into the connector body,
   wherein the distal end of at least one of the plurality of teeth segments comprises an angular twist and a tip angle on a distal edge of each of the plurality of teeth segments of between 90 degrees and 30 degrees,
   wherein the angular twist of a distal end of each of the plurality of teeth segments together creates a left-hand helix or a right-hand helix;
   wherein the retainer ring is configured to resist an axial pull-out force of between 300 and 1,000 pounds; and
   wherein the connector body is configured to be electrically conductive therethrough.

2. The threadless connector of claim 1, wherein the plurality of teeth segments of the retainer ring face inward when the retainer ring is disposed in the connector body.

3. The threadless connector of claim 1, wherein at least one of the plurality of teeth segments of the retainer ring is non-conical along its axial length.

4. The threadless connector of claim 1, wherein the plurality of teeth segments are angled inwardly between 30 degrees and 60 degrees.

5. The threadless connector of claim 1, wherein the connector body is integrally formed on an end of a conduit.

6. The threadless connector of claim 1, wherein the connector body is a fitting selected from a group consisting of a coupling, an elbow, a tee, and an electrical box connector fitting.

7. The threadless connector of claim 1, wherein the connector body comprises a diecast zinc aluminum alloy.

8. The threadless connector of claim 1, wherein the connector body comprises a zinc plated steel.

9. The threadless connector of claim 1, wherein the retainer ring is split.

10. The threadless connector of claim 1, wherein the retainer ring is continuous.

11. A retainer ring for a threadless connector, the retainer ring comprising:
    a circular band having a plurality of teeth segments extending axially therefrom and arranged around a circumference of the circular ring;
    a specified tip angle on a distal edge of each of the plurality of teeth segments of between 90 degrees and 30 degrees,
    wherein the distal end of at least one of the plurality of teeth segments comprises an angular twist,
    wherein the angular twist of a distal end of each of the plurality of teeth segments together creates a left-hand helix or a right-hand helix;
    wherein the retainer ring is configured to resist an axial pull-out force of between 300 and 1,000 pounds when disposed around the threadless connector; and
    wherein the retainer ring comprises an electrically conductive material.

12. The retainer ring of claim 11, wherein the plurality of teeth segments are angled inward toward a central axis of the circular band.

13. The retainer ring of claim 12, wherein the plurality of teeth segments are angled inwardly between 30 degrees and 60 degrees.

14. The retainer ring of claim 11, wherein the plurality of teeth segments are configured having radiused leading edge for disassembly.

15. The retainer ring of claim 11, wherein the angular twist of the at least one of the plurality of teeth segments is between 2 and 15 degrees.

16. The retainer ring of claim 11, wherein the circular band is split.

17. The retainer ring of claim 11, wherein the circular band is continuous.

* * * * *